US012581044B1

(12) United States Patent
Merchant et al.

(10) Patent No.: US 12,581,044 B1
(45) Date of Patent: Mar. 17, 2026

(54) COMPUTER VISION-BASED PROJECTION STEERING

(71) Applicant: Amazon Technologies, Inc., Seattle, WA (US)

(72) Inventors: Kevin Thomas Merchant, Oakton, VA (US); Oytun Akman, Oakland, CA (US); Kevin Karsch, Oakland, CA (US); Murad Al Haj, Mountain View, CA (US); Steven Alexander Schwarcz, Issaquah, WA (US); Mahesh Goud Tandarpally, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 18/538,865

(22) Filed: Dec. 13, 2023

(51) Int. Cl.
| | |
|---|---|
| *H04N 9/31* | (2006.01) |
| *G06F 3/01* | (2006.01) |
| *G06F 3/16* | (2006.01) |
| *G06T 7/73* | (2017.01) |
| *G06V 40/20* | (2022.01) |

(52) U.S. Cl.
CPC ........... *H04N 9/3179* (2013.01); *G06F 3/013* (2013.01); *G06F 3/017* (2013.01); *G06F 3/167* (2013.01); *G06T 7/74* (2017.01); *G06V 40/28* (2022.01); *G06T 2207/20081* (2013.01); *G06T 2207/30196* (2013.01); *G06T 2207/30242* (2013.01)

(58) Field of Classification Search
CPC ....... H04N 9/3179; G06F 3/013; G06F 3/017; G06F 3/167; G06T 7/74; G06T 2207/20081; G06T 2207/30196; G06T 2207/30242; G06V 40/28

USPC ........................................................ 348/744
See application file for complete search history.

(56) References Cited

U.S. PATENT DOCUMENTS

| | | | | |
|---|---|---|---|---|
| 8,836,222 B1 * | 9/2014 | Patrick | ................... | H05B 47/12 |
| | | | | 315/154 |
| 11,237,466 B2 * | 2/2022 | VanBlon | ............... | G06T 19/003 |
| 2014/0247263 A1 * | 9/2014 | Wilson | ............... | F16M 11/2064 |
| | | | | 345/420 |
| 2018/0285634 A1 * | 10/2018 | Varadarajan | ......... | G06V 40/107 |
| 2020/0374498 A1 * | 11/2020 | Sodhi | ................... | H04N 9/3176 |

* cited by examiner

*Primary Examiner* — John W Miller
*Assistant Examiner* — Omer Khalid
(74) *Attorney, Agent, or Firm* — K&L Gates LLP

(57) ABSTRACT

Techniques are generally described for steering projection based on computer vision determination of body position, gaze, and pointing gestures. An example method includes identifying a set of candidate projection surfaces and receiving a voice command to begin projection. The example method also includes capturing a wide-area scene image with a top-down perspective and determining an array of location coordinates indicative of a location of a human in the wide-area scene image, where the array of location coordinates is further indicative of a pointing direction of the human in the wide-area scene image. Finally, the example method includes determining a target projection surface from the set of candidate projection surfaces based on proximity to the location of the human and the pointing direction of the human and projecting a projection image onto the target projection surface.

21 Claims, 9 Drawing Sheets

200

400

Yaw Motor 404

Cable Spool Assembly 402

Motor Controller 406

Light Engine 414

Mirror Assembly 408

Motherboard 412

Powered USB Hub 410

600

Cable Spool
Assembly
602

Microcontroller
604

Mirror
Assembly
606

Motor Driver
608

Light
Engine
610

Context Camera
612

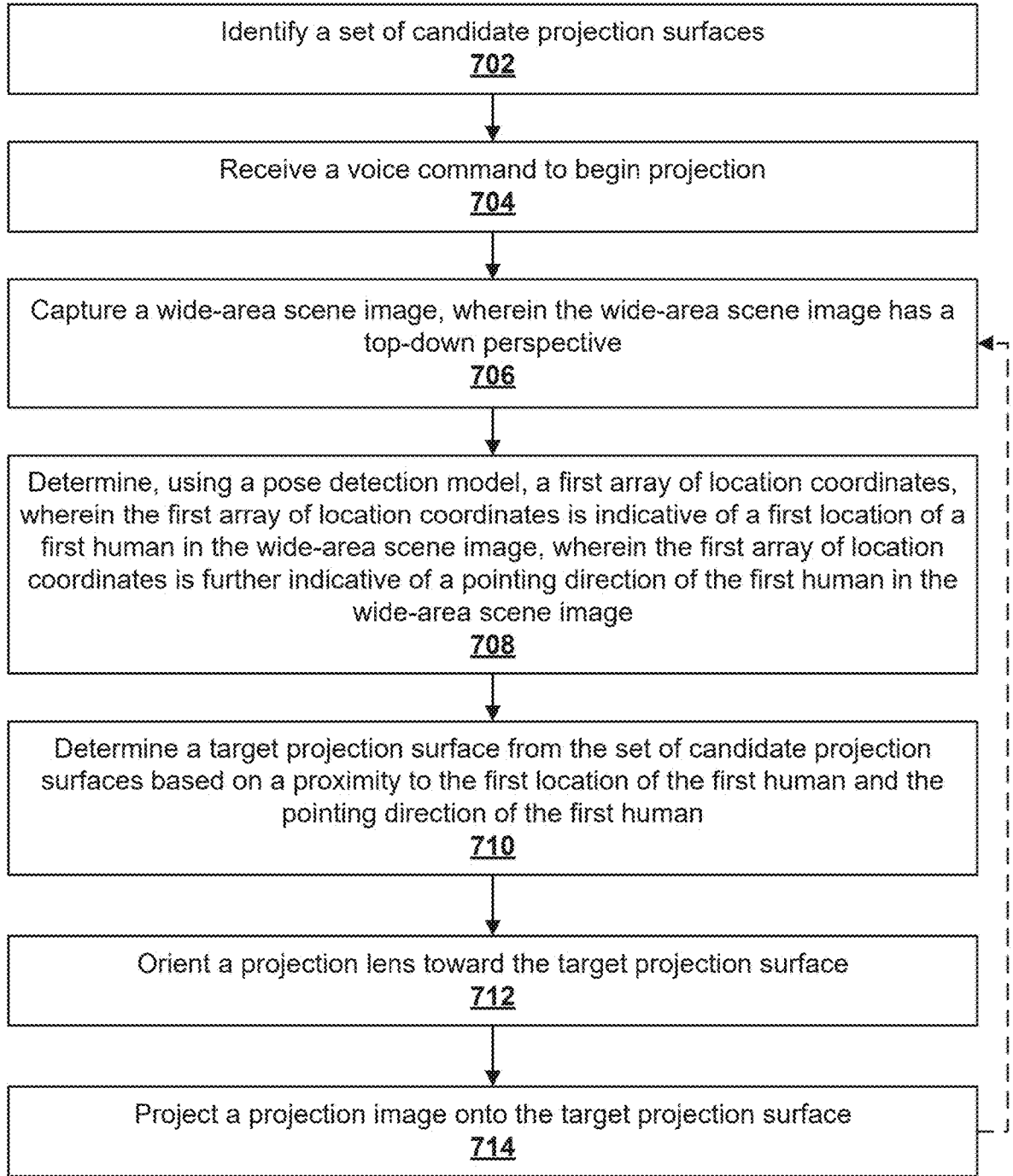

Identify a set of candidate projection surfaces
702

Receive a voice command to begin projection
704

Capture a wide-area scene image, wherein the wide-area scene image has a top-down perspective
706

Determine, using a pose detection model, a first array of location coordinates, wherein the first array of location coordinates is indicative of a first location of a first human in the wide-area scene image, wherein the first array of location coordinates is further indicative of a pointing direction of the first human in the wide-area scene image
708

Determine a target projection surface from the set of candidate projection surfaces based on a proximity to the first location of the first human and the pointing direction of the first human
710

Orient a projection lens toward the target projection surface
712

Project a projection image onto the target projection surface
714

FIG. 7

From
708

Determine a gaze direction, wherein the first array of location coordinates
identifies the gaze direction
802

Determine a hand gesture direction, wherein the first array of location
coordinates identifies the hand gesture direction
804

To
710

COMPUTER VISION-BASED PROJECTION STEERING

BACKGROUND

Modern computer interfaces may utilize computer vision (CV) to expand the range of possible user inputs. For example, users may interact with a computing device using manual gestures, by directing their gaze, or by moving throughout a space in view of a camera. Combining CV-based inputs with voice commands and traditional input devices greatly expands capabilities for users to interact with devices, particularly when moving throughout a room or other space.

BRIEF DESCRIPTION OF DRAWINGS

FIG. 7 is a block diagram illustrating an example process for providing steering projection based on CV determination of body position, gaze, and pointing gestures, in accordance with various aspects of the present disclosure.

DETAILED DESCRIPTION

Figure 1:
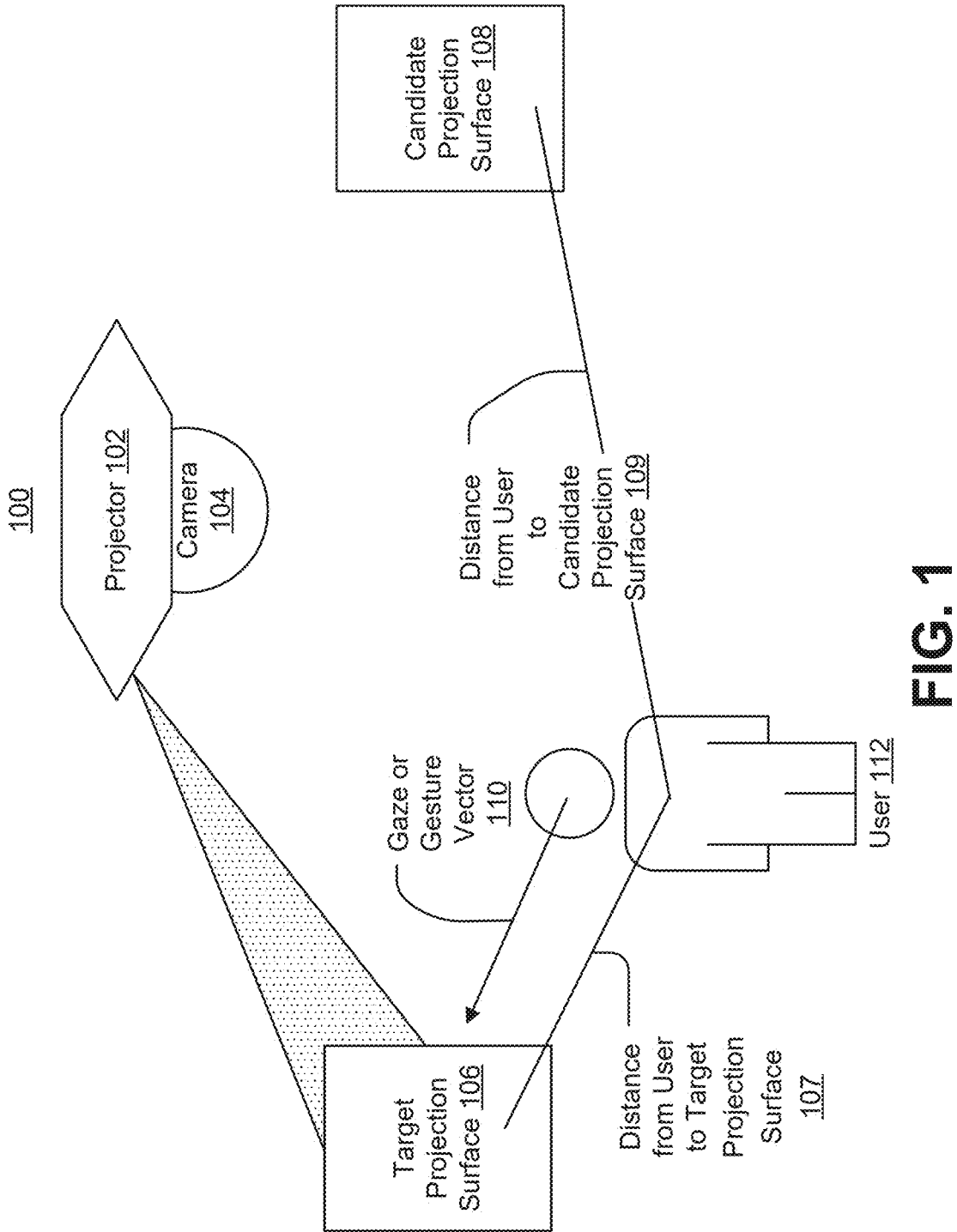
FIG. 1 illustrates an example system effective to provide steering projection based on CV determination of body position, gaze, and pointing gestures, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are systems, techniques, and interfaces that may be used for steering projection of a projector device based on computer vision (CV) determinations of a user's body position, gaze, and pointing gestures. In various examples disclosed herein, the projector device may be a component of an apparatus including a plurality of cameras for adaptable projector display in a room environment.

Various examples may include a visible-spectrum context camera with a hemispherical ($2\pi$ steradian) field of view (FOV). The context camera may be used to detect and identify movement paths of users in the room, detect postures (e.g., sitting, standing, facing direction, etc.), and detect gestures (e.g., arm pointing). The context camera may also be used to facilitate determination of acceptable projection surfaces for the steerable projector to project onto. The context camera may further include an infrared (IR) cut filter.

Various examples may also include a steerable camera that serves to determine focus quality of image projections for system auto focus in a visible light mode. The steerable camera may further map and track user hand gestures for content interaction in an infrared mode. The steerable camera may include both a visible light cut filter and an IR cut filter to enable switching between these modes. The IR mode may work under strong ambient lighting (e.g., sunlight), but for low near-IR light conditions, an additional near-IR irradiation source may be included for hand tracking (e.g., an IR light-emitting diode).

Various example may also include a direct time of flight (dToF) sensor. The dToF sensor may be used to measure a distance between the apparatus and a projection surface and to determine the angle of incidence of the projection surface relative to a projection axis for calculating correctional warping and/or keystone correction. Keystone correction refers to compensation to avoid the trapezoidal shape caused when the lens is not oriented precisely with respect to a projection surface. The dToF sensor may operate in the 940 nm near-IR band while being insensitive to the 850 nm near-IR band and the visible band.

In various examples, the projector system's auto focus method may leverage both the dToF camera (for fast focus estimation) and the visible mode of the steerable camera (for fine focus adjustment, and to check the dToF camera's estimation quality to account for, e.g., system aging).

In various examples, the projector device may utilize CV to determine locations in an area that are suitable projection surfaces. In accordance with various examples disclosed herein, knowledge of such determined suitable locations may be presumed to exist in memory or other storage. For example, this knowledge may have been programmed ahead of time into the device based on prior input, or determined automatically by another method outside the scope of the present disclosure.

In various examples, the projector device may use CV to determine a position of a user in a room, and the system may subsequently determine an available display location that is preferable (e.g., satisfies certain pre-determined conditions or optimizes a pre-determined function) based on the position of the user (e.g., a candidate display location that is located closest to the determined position of the user).

In various examples, the projector device may use CV to determine a gaze of a user in a room, and the system may subsequently determine an available display location that is preferable (e.g., satisfies certain pre-determined conditions or optimizes a pre-determined function) based on the determined gaze of the user (e.g., a candidate display location that is located closest to a projection of the user's gaze).

In various examples, a user may trigger the system, for example using a voice command to "project over there" while pointing in a direction. The system may use CV to determine a direction the user is pointing, and the system may subsequently determine a display location that is preferable (e.g., satisfies certain pre-determined conditions or optimizes a pre-determined function) based on the determined pointing direction (e.g., a candidate display location that is located closest to a projection of the direction from the user or the user's finger).

In various examples, the system may capture user verbal commands and use them to select an operating mode of the system, for example, commands may be "follow me," "follow my gaze," or "project over there." In some examples, the operating mode of the system may alternatively be inferred based on context or predefined rules. For instance, in the absence of a user command to define the operating mode of the system, the operating mode of the system may be set to a default operating mode, or the operating mode may be inferred based on user behavior during delivery of verbal commands (e.g., a specific point gesture performed by a user while the user states a verbal command may be interpreted as the equivalent of a "project over there" command).

In various examples, the system may identify a plurality of users in a room and receive a command to project an image onto an available surface. The system may use CV to determine a display location that is preferable (e.g., satisfies certain pre-determined conditions or optimizes a pre-determined function) based on the location of each of the plurality of users in the room and their proximity to the display surfaces (e.g., a candidate display location that is located, on average, as close as possible to each user in the room and is not obscured by the presence of a user in the path between the projector device and the display surface).

The CV-based steerable image projection provides many advantages over previous solutions in the art. For example, CV steering enables a steerable projector to dynamically utilize every candidate projection surface in a room, while traditional projectors must either project onto a single surface, be manually repositioned, or transition between a fixed set of projection surfaces. Furthermore, the CV-enabled steerable projection system enables new ways of providing user inputs to a projector system that were previously impossible. The combination of voice commands, gesture commands, and positional awareness unlocks entirely new modes of user interface and/or interaction exemplified by the "follow me," "follow my gaze," and "project over there" modes described above.

Various examples disclosed herein represent technical advances that bring improvements to the field of user interfaces for electronic devices. By applying advances in the field of CV and artificial intelligence (AI) to create a new interaction modality for users, various examples unlock new avenues for user interfaces and user interactions. Furthermore, coupling these new interactions with the steerable projector system described previously brings new technical advances to the ways projectors may be used, particularly in home and office settings. For example, users may use a single steerable projector system to project videos for home entertainment, meetings for a conference room, or additional displays for a workstation without having to purchase additional fixed display units.

Machine learning (ML) and/or AI techniques, such as those described herein, are often used to form predictions, solve problems, recognize objects in image data for classification, etc. For example, ML techniques may be used to detect objects represented in image data and/or translate text from one spoken language to another. In various examples, ML models may perform better than rule-based systems and may be more adaptable as ML models may be improved over time by retraining the models as more and more data becomes available. Accordingly, ML techniques are often adaptive to changing conditions. Deep learning algorithms, such as neural networks, are often used to detect patterns in data and/or perform tasks.

Generally, in ML or AI models, such as neural networks, parameters control activations in neurons (or nodes) within layers of the ML models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in ML or AI models, such as neural networks, after initialization, annotated training data may be used to generate a cost or "loss" function that describes the difference between expected output of the ML model and actual output. The parameters (e.g., weights and/or biases) of the ML model may be updated to minimize (or maximize) the cost. For example, the ML model may use a gradient descent (or ascent) algorithm to incrementally adjust the weights to cause the most rapid decrease (or increase) to the output of the loss function. The method of updating the parameters of the ML model is often referred to as back propagation.

Object detection methods, including those disclosed herein, are an application of CV used for finding and identifying objects in images. Object detection is widely used in applications such as automated vehicle systems, image retrieval, and the like. Some of the most popular deep learning object detection models use a convolutional neural network (CNN) architecture. CNNs are deep neural networks that include at least one convolutional layer, which convolves inputs and passes the result to the next layer.

Object detection models may be broadly classified into single-stage networks and two-stage networks. The single-stage approach, or single-shot object detection, processes an image using a single pass through the CV model. Single-stage detection may be more computationally efficient but less accurate and thorough than a two-stage approach. In contrast, the two-stage or two-shot object detection approach uses two passes over an input image. The first stage identifies region proposals, subsets of the image that may contain candidate objects. The second stage classifies objects within each of the region proposals generated in the first stage. Two-stage approaches may be more accurate and thorough than single-stage approaches, but may also be more computationally intensive.

Object detection models may return candidate detected images using bounding boxes, and may also provide a score and/or probability associated with each bounding box. Some object detection models may also provide an identification of the object corresponding to each bounding box, or may link to other models to provide identification for each bounding box. In some instances, object detection models may generate segmentation masks for detected objects instead of, or in addition to, bounding boxes.

Pose detection methods, including those disclosed herein, are another application of CV used for finding the pose of a subject's body in an image. Pose detection may be used in conjunction with object detection to detect, identify, and detect the post of a human subject. Pose detection works by identifying landmark points on the subject's body such as shoulders and hips. The positions of the identified landmarks may be combined to describe an overall pose of a subject. In some instances, not all of the defined landmarks for a subject may be present in the image (e.g., part of a subject's body is out of the camera's frame). Certain pose detection models may assign a probability to each pose landmark corresponding to whether the landmark is present in the image.

Pose estimation may be broadly separated into categories of 2D pose estimation and 3D pose estimation. With 2D pose estimation, landmark coordinates are found with respect to a two-dimensional plane, typically the plane coinciding with the image's coordinate system. With 3D pose estimation, a z-coordinate is added and the pose is estimated in a three-dimensional space. Deep learning pose detection models typically use CNNs as the network architecture, although other approaches, including approaches that do not use AI at all, are available. Pose estimation models may also be specialized and/or trained for particular purposes, such as facial pose recognition, full-body pose recognition, or the like.

For images with multiple human subjects, pose detection may be performed with a bottom-up or top-down approach. In the top-down approach, humans may first be identified in the image, then pose detection may be performed on each human. In a bottom-up approach, landmarks may be identified first on each human subject in the image, and multiple pose estimates may be built up using the entire image.

Previous efforts known in the art for pose and position detection using CV have focused primarily on side views of human subjects, primarily for applications where a camera is at or near human-scale height. Previous efforts have also focused on images from rectilinear lenses rather than wide angle or fisheye lens images with visual distortion. Thus, various examples disclosed herein represent advances over the prior art in understanding and developing methods for position and pose detection using overhead views and/or wide-angle (fisheye) lenses.

FIG. 1 illustrates an example system 100 effective to provide steering projection based on CV determination of body position, gaze, and pointing gestures, in accordance with various aspects of the present disclosure. The high-level overview shown in FIG. 1 illustrates general concepts that may be shared by various examples disclosed herein. The example system 100 is embodied by an apparatus comprising a projector 102 and a camera 104. Projection surfaces are illustrated as target projection surface 106 and candidate projection surface 108, where the projector 102 is projecting an image onto target projection surface 106.

The projector 102 may be a steerable projector effective to project various images at points in a room other space as illustrated at a high level in FIG. 1. For example, the projector may include motors, gearing, wiring, and the like allowing a projection lens to move and project onto several possible surfaces, such as target projection surface 106 and candidate projection surface 108.

The camera 104 may be a context camera and/or wide-angle (fisheye) lens camera effective to identify human subjects and human poses in the room. The camera 104 (and/or a second camera, not shown in FIG. 1) may further be effective to identify and gather visual information regarding the projection surfaces, such as target projection surface 106 and candidate projection surface 108. Example apparatuses embodying the projector 102 and/or camera 104 are described below in connection with FIGS. 2-6.

The system 100 may identify a plurality of projection surfaces using the camera 104, or may receive projection surface data from an external source. In various examples, the system 100 may determine, based on factors such as the mode of operation, user commands, user position and/or gesture, a target projection surface 106 from the plurality of projection surfaces. For example, the system 100 may determine the target projection surface 106 from the set of projection surfaces by finding the projection surface with the least distance to the user 112. The system 100 may check distances from the user to each projection surface, such as distance from user to target projection surface 107 and distance from user to candidate projection surface 109. In the example illustrated in FIG. 1, the distance from user to target projection surface 107 is less than the distance from user to candidate projection surface 109, so the target projection surface 106 is selected for projection rather than the candidate projection surface 108.

In various examples, the system 100 may determine the target projection surface 106 from the set of projection surfaces by finding the projection surface closest to the path of a user's gaze or gesture vector 110. In various modes of operation, the system 100 may identify, using pose detection modeling, landmark points on the body of the user 112 (e.g., head, shoulders, eyes, elbow, hands) may be used to construct vectors representing the direction of the gaze of the user 112 (e.g., using head and eye landmark points) and/or a gesture (e.g., an arm gesture using the shoulder, elbow, and/or hand points), referred to as a gaze or gesture vector 110 in FIG. 1. The system 100 may use the gaze or gesture vector 110 to determine the target projection surface 106 using the gaze or gesture vector 110, for example, by finding the projection surface with the shortest distance (e.g. perpendicular distance to the gaze or gesture vector 110, considering only the positive direction, or direction of the gaze of the user 112) to the gaze or gesture vector 110. In various examples, the system 100 may combine information about the location of the user 112 and/or the gaze or gesture vector 110 to assign a score to each projection surface, (e.g. the target projection surface 106 may be assigned a higher score than the candidate projection surface 108). The score may include consideration of the distance from user to target projection surface 107 and gaze or gesture vector 110 weighted according to pre-configured weights, where the weights may depend on the mode of operation. For example, when a user 112 issues a command such as "follow my gaze," the system 100 may assign a larger weight to a mathematical term including a distance to the gaze or gesture vector 110, and a comparatively smaller weight to a mathematical term including the distance from user to target projection surface 107 (or distance from user to candidate projection surface 109). When executing the command "follow my gaze" the system 100 may use various functional forms to more highly score projection surfaces in the line of sight of the user 112, such as heavily penalizing projection surfaces behind the user 112, assigning higher scores to projection surfaces found in a cone around the gaze or gesture vector 110, and/or the like.

Figure 2:
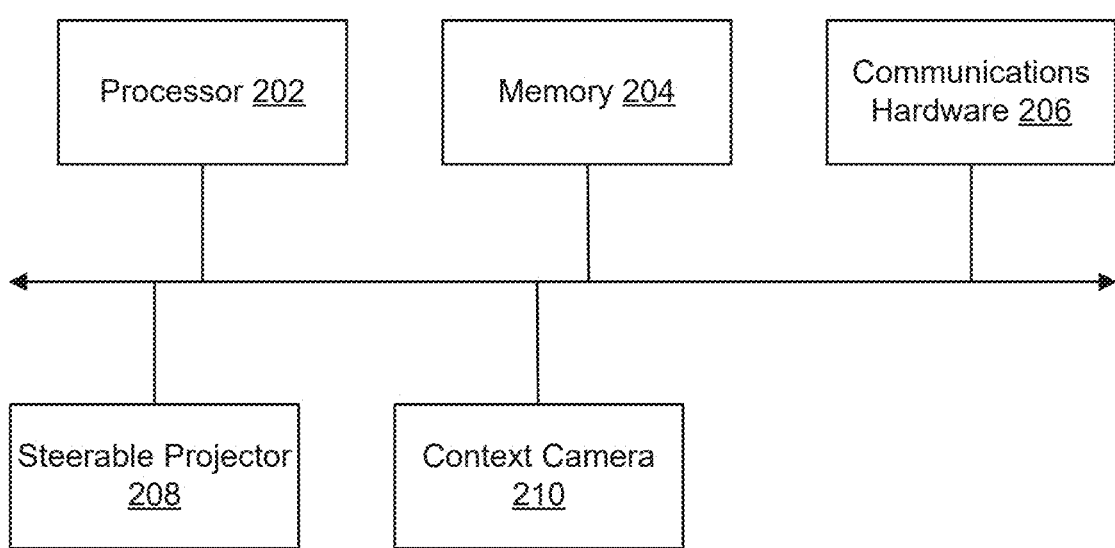
FIG. 2 is a block diagram illustrating an example apparatus for providing steering projection based on CV determination of body position, gaze, and pointing gestures that may be used in accordance with various aspects of the present disclosure.

FIG. 2 is a diagram illustrating an example apparatus for providing steering projection based on CV determination of body position, gaze, and pointing gestures that may be used in accordance with various aspects of the present disclosure. The steering projection system (described previously with reference to FIG. 1) may be embodied by one or more computing devices, shown as apparatus 200 in FIG. 2. The apparatus 200 may be configured to execute various operations described above in connection with FIG. 1 and below in connection with FIG. 7. As illustrated in FIG. 2, the apparatus 200 may include processor 202, memory 204, communications hardware 206, steerable projector 208, and context camera 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various examples of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with various examples contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in various examples, to receive an indication of user input. In this regard, the communications hardware 206 may comprise a user interface, such as a display and audio speakers. In various examples, the apparatus 200 may be limited to the use of the steerable projector 208 for providing visual output to the user in conjunction with the attached audio speakers of the communications hardware 206. In various examples, the communications hardware 206 may include a keyboard, a mouse, a touch screen, touch areas, soft keys, a microphone, a speaker, and/or other input/output mechanisms. In various examples, the user interface of the apparatus 200 may be limited to voice commands, which may be detected by communications hardware 206, described below, and in this instance the communications hardware 206 may not include an attached keyboard, mouse, touch screen, or the like. The communications hardware 206 may utilize the processor 202 to control one or more functions of one or more of these user interface elements through software instructions (e.g., application software and/or system software, such as firmware) stored on a memory (e.g., memory 204) accessible to the processor 202.

The communications hardware 216 may include various components used to provide additional information to the apparatus 200 such as microphones or the like. In various examples, activation of the steerable projector 208 may be triggered by a voice command, which may be received by a microphone of the communications hardware 206. In various examples, a microphone of the communications hardware 206 may receive various commands that may initiate and/or modify the projection of images in the room.

The steerable projector 208 may be a projector effective to project images at a resolution and rate needed to be visible to a user at various locations throughout a room. In various examples, the steerable projector 208 may include motorized components, flexible cabling, power supply, lighting, mirrors, additional cameras, heat sinks, rotating brackets, and other componentry required to enable the steerable projector 208 to project images to a projection surface identified in a space. The steerable projector 208 may include or be in communication with additional systems that may identify a projection surface. The projection surface may be identified by coordinates in a pre-determined coordinate system, and the steerable projector 208 may include capabilities to rotate, focus, and adjust projection onto the projection surface upon being provided with the coordinates of the projection surface. In various examples, the steerable projector 208 may automatically compensate for coordinates or other indications of the projection surface by transforming the coordinates, either using processor 202 or processing capabilities of the steerable projector 208 to automatically transform coordinates and determine a realizable projection surface from intermediate projection surface data.

The context camera 210 may serve to collect information about the projection surface and/or the wider space in which the apparatus 200 is situated. The context camera 210 may include color (RGB) imaging capabilities to receive color information about the projection surface. In various examples, the context camera 210 may be configured to identify environmental obstacles to projecting, including humans, pets, movable objects, and/or the like to provide updated information concerning the condition of the projection surface (e.g., the context camera 210 may provide an alert if a pet moves in front of the projection surface, which may trigger the system to identify a new projection surface and move steerable projector 208 to the new projection surface).

The context camera 210 may serve to provide important visual information about the projection surface, including the color, texture, reflectivity, and other properties of the projection surface. The context camera 210 may further provide an image of the projection surface for the purposes of edge or contour detection. In various examples, the context camera 210 may include dedicated hardware for transforming the distorted wide-angle images from the camera to rectilinear images, or the context camera 210 may rely on processor 202 for transforming images.

Furthermore, the context camera 210 may include resolution and angle sufficient to capture images of one or more users in a living space, office, conference room, or other space as the user or users move about the space. In various examples, the context camera 210 may have a hemispherical ($2\pi$ steradian) FOV. The context camera 210 may have resolution sufficient to detect a user's arm gestures, gaze direction, and/or the like. In various examples, the context camera may include an IR cut filter.

As mentioned previously, the apparatus 200 may be equipped with additional cameras for special purposes, such as a steerable camera for projector focus and fine user gesture detection. Additional camera may use additional spectra such as IR or near-IR for operating in low ambient light or high ambient light environments (e.g. outdoors). The camera's IR capabilities may assist in detecting fine gesture movements of one or more users in the room. The apparatus 200 may further include a dToF sensor camera used to measure distances in the room and provide geometric data for the steerable projector 208. The dToF sensor may operate in a near-IR band distinct from the band of operation of the steerable camera to avoid cross-saturation of the dToF sensor and other capabilities of the apparatus 200 provided by the steerable camera.

Although components 202-210 are described in part using functional language, it will be understood that the particular implementations necessarily include the use of particular hardware. It should also be understood that certain of these components 202-210 may include similar or common hardware. For example, the communications hardware 206, steerable projector 208, and context camera 210 may each at times leverage use of the processor 202 or memory 204, such that duplicate hardware is not required to facilitate operation of these physical elements of the apparatus 200 (although dedicated hardware elements may be used for any of these components in various examples, such as those in which enhanced parallelism may be desired).

Although the steerable projector 208, and context camera 210, may leverage processor 202, memory 204, or communications hardware 206 as described above, it will be understood that any of steerable projector 208 and context camera 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In various examples, however, it will be understood that steerable projector 208, context camera and 210 comprise particular machinery designed for performing the functions described herein in connection with such elements of apparatus 200.

In various examples, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, various examples contemplated herein may be implemented by an apparatus 200. Furthermore, some examples may take the form of a computer program product comprising software instructions stored on at least one non-transitory computer-readable storage medium (e.g., memory 204). Any suitable non-transitory computer-readable storage medium may be utilized in such example systems, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Figure 3:
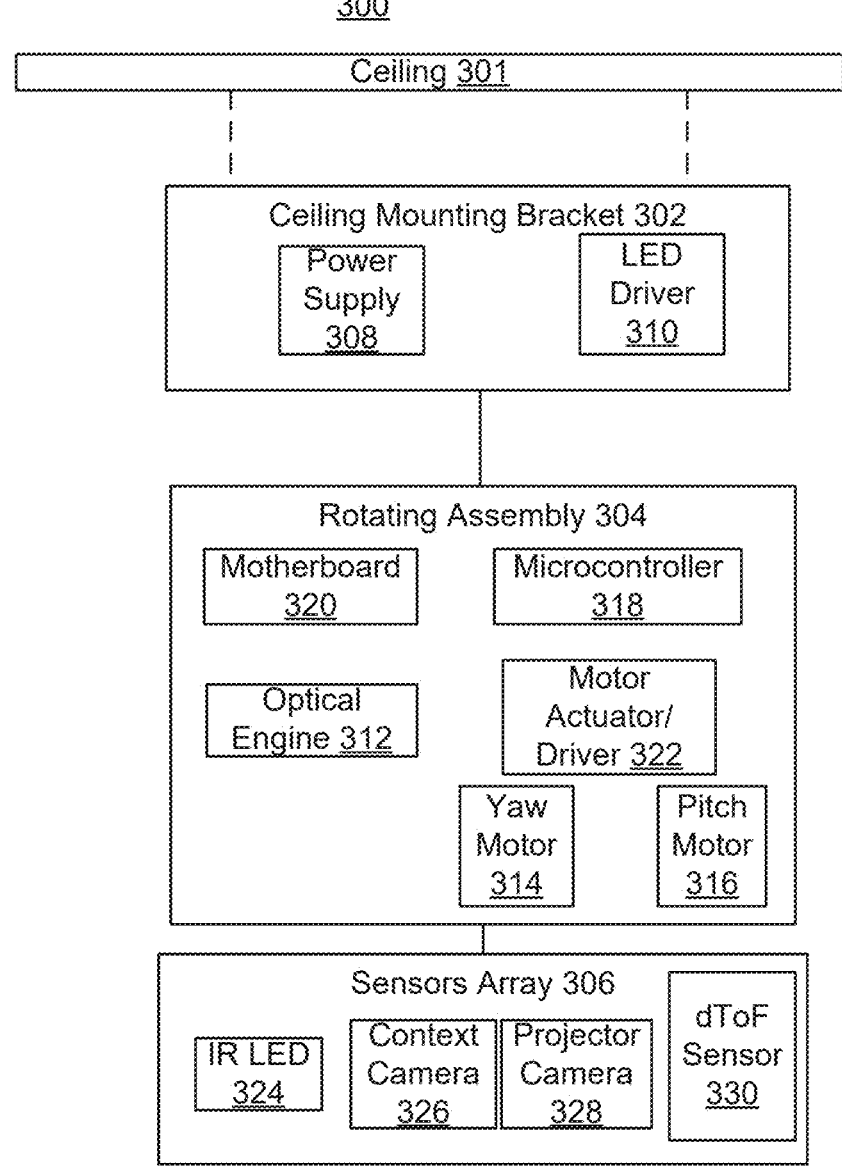
FIG. 3 is a design drawing illustrating an example apparatus for providing steering projection based on CV determination of body position, gaze, and pointing gestures that may be used in accordance with various aspects of the present disclosure.

FIG. 3 is a design drawing illustrating an example apparatus 300 for providing steering projection based on CV determination of body position, gaze, and pointing gestures. The steering projection system (described previously with reference to FIGS. 1 and 2) may be embodied in part by apparatus 300. FIG. 3 depicts the example apparatus as a block diagram showing component circuitry and wiring of the apparatus. Main components depicted are the ceiling mounting bracket 302 (connected to the ceiling 301), rotating assembly 304, and sensors array 306. The ceiling mounting bracket 302 may house mounted electronics including a power supply 308 and LED driver 310. The rotating assembly 304 may connect to the ceiling mounting bracket 302 and house various components depicted in FIGS. 4-6 and described below. It will be appreciated that a ceiling-mounted steering projection system comprises just one embodiment contemplated herein. In various other embodiments, the steering projection system need not be mounted to the ceiling, and may instead be positioned to offer a top-down perspective of an environment via other methods. For instance, the steering projection system may be held in an elevated position by a cantilevered arm. As another example, the steering projection system may be mounted high along a wall within the environment. In non-ceiling-mounted implementations, the rotating assembly 304 may connect to the respective components used to affix the steering projection system within the environment. Housed components may include an optical engine 312 including projection lens and projector, a yaw motor 314 and pitch motor 316 directed by motor actuator/driver 322, microcontroller 318 and motherboard 320. The sensors array 306 may house various cameras and sensors, also depicted in FIGS. 4-6 and described below. The housed cameras and sensors may include an IR LED 324, context camera 326, projector camera 328, and dToF sensor 330.

Figure 4:
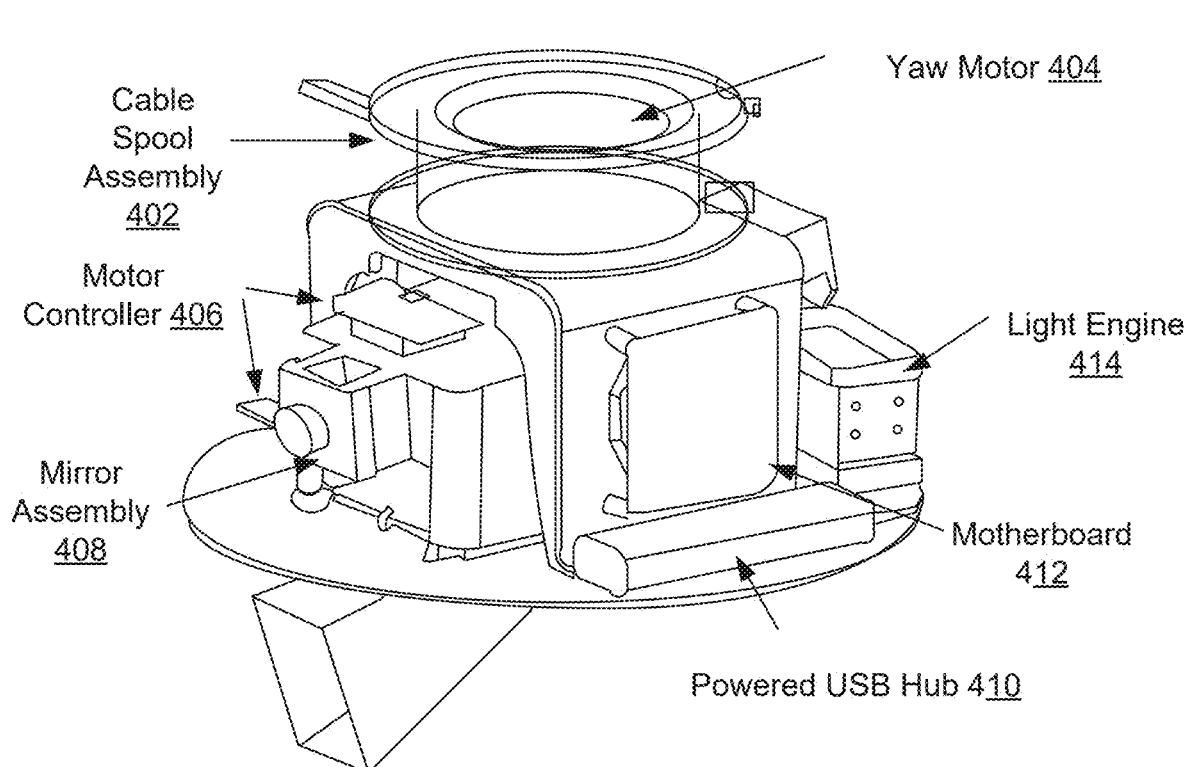
FIG. 4 is an additional design drawing illustrating an example apparatus for providing steering projection based on CV determination of body position, gaze, and pointing gestures that may be used in accordance with various aspects of the present disclosure.

FIG. 4 is a design drawing illustrating an example apparatus 400 for providing steering projection based on CV determination of body position, gaze, and pointing gestures. The steering projection system (described previously with reference to FIGS. 1-3) may be embodied in part by apparatus 400. FIG. 4 depicts the example apparatus from an inclined angle, showing various components of the rotating assembly. The cable spool assembly 402 is shown at the top of the figure, housing cables connecting to the ceiling mounting bracket (not pictured). The rotating assembly includes the yaw motor 404, motor controller 406, and mirror assembly 408, enabling steering of the steerable projector. The rotating assembly further includes a power universal serial bus (USB) hub 410, motherboard 412, and light engine 414.

Figure 5:
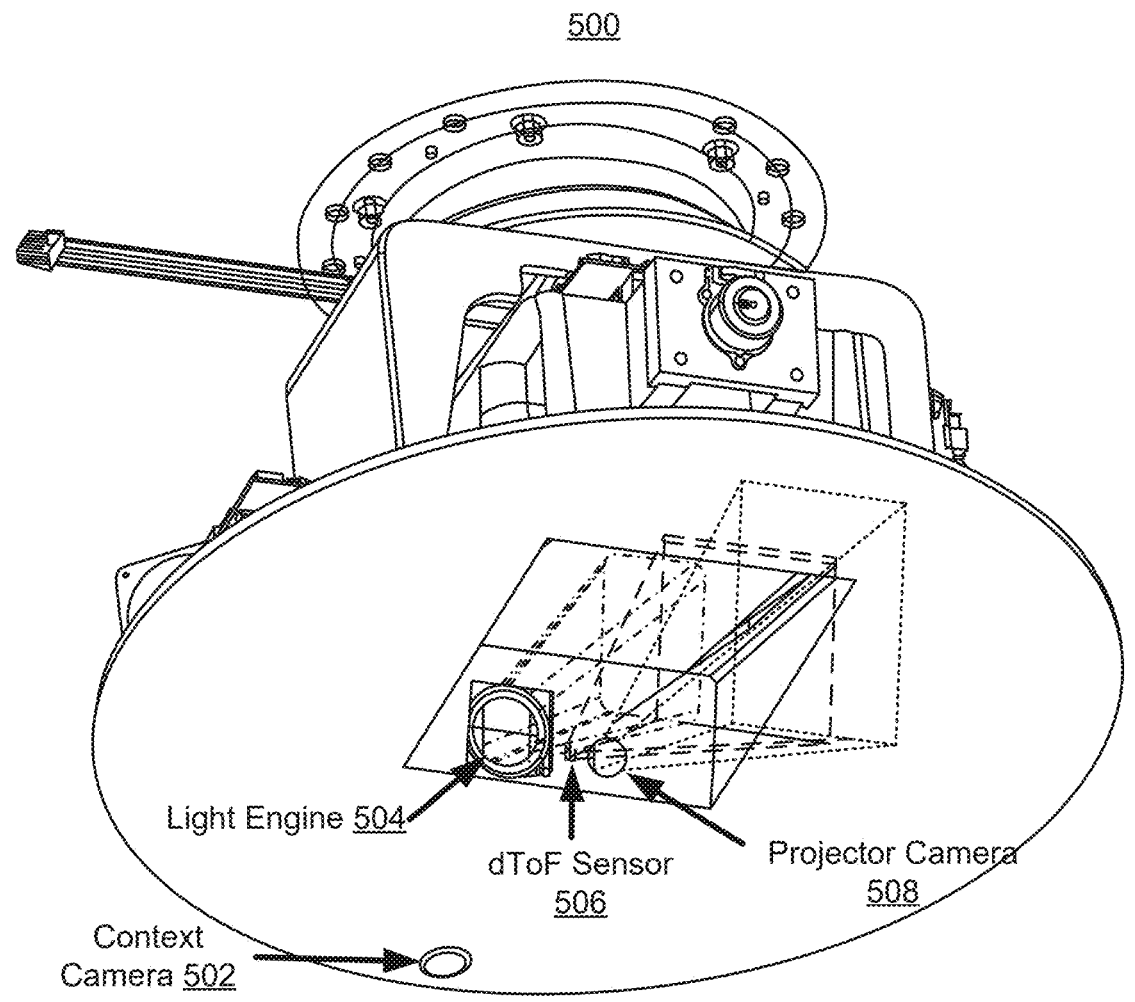
FIG. 5 is an additional design drawing illustrating an example apparatus for providing steering projection based on CV determination of body position, gaze, and pointing gestures that may be used in accordance with various aspects of the present disclosure.

FIG. 5 is a design drawing illustrating an example apparatus 500 for providing steering projection based on CV determination of body position, gaze, and pointing gestures. The steering projection system (described previously with reference to FIGS. 1-4) may be embodied in part by apparatus 500. FIG. 5 depicts the example apparatus from below, showing various components of the sensors array. The sensors array includes the context camera 502, light engine 504, dToF sensor 506, and projector camera 508.

Figure 6:
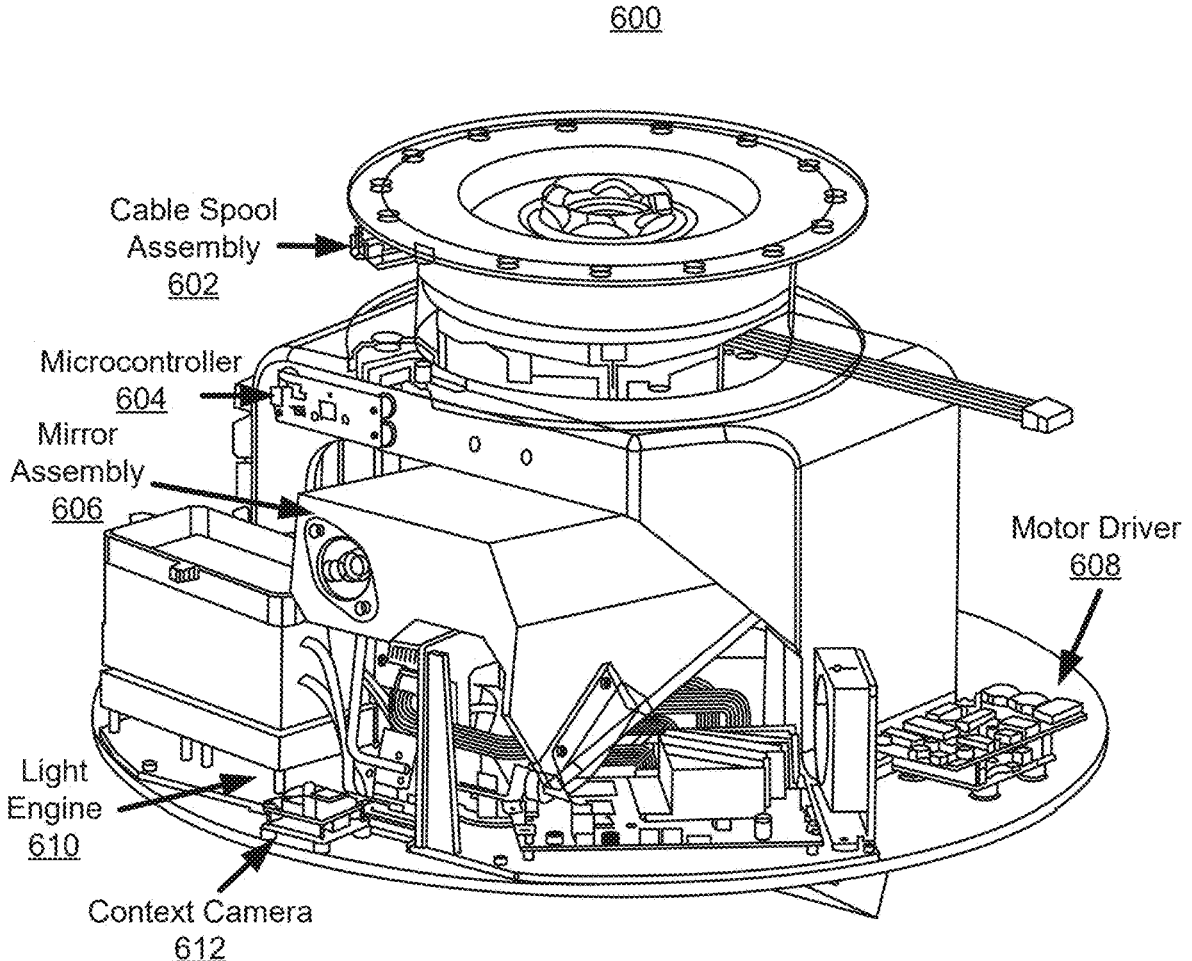
FIG. 6 is an additional design drawing illustrating an example apparatus for providing steering projection based on CV determination of body position, gaze, and pointing gestures that may be used in accordance with various aspects of the present disclosure.

FIG. 6 is a design drawing illustrating an example apparatus 600 for providing steering projection based on CV determination of body position, gaze, and pointing gestures. The steering projection system (described previously with reference to FIGS. 1-5) may be embodied in part by apparatus 600. FIG. 5 depicts the example apparatus at an inclined angle (opposite the view of FIG. 4), showing various components of the rotating assembly. The rotating assembly includes the cable spool assembly 602, mirror assembly 606, light engine 610, and motor driver 608, as also shown in FIG. 4. The rotating assembly further includes the microcontroller 604 and a view of the context camera 612 from above.

Figure 8:
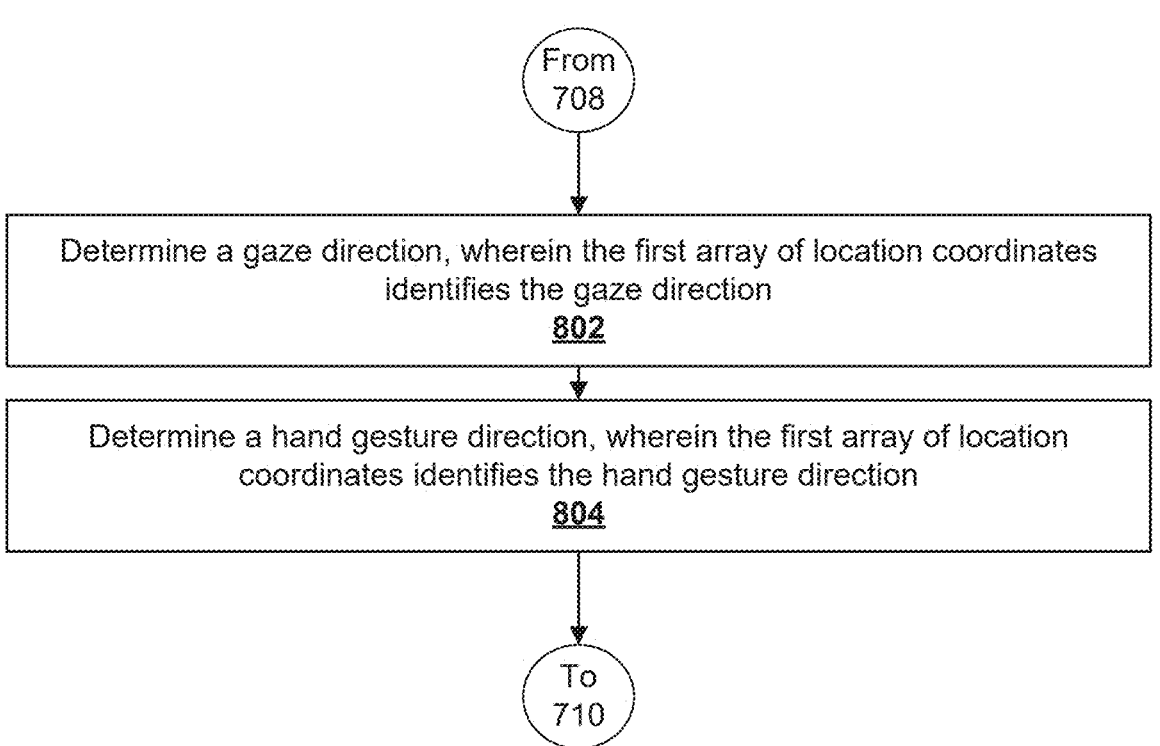
FIG. 8 is a block diagram illustrating an example process for providing steering projection based on a gaze and/or hand gesture determination, in accordance with various aspects of the present disclosure.
Figure 9:
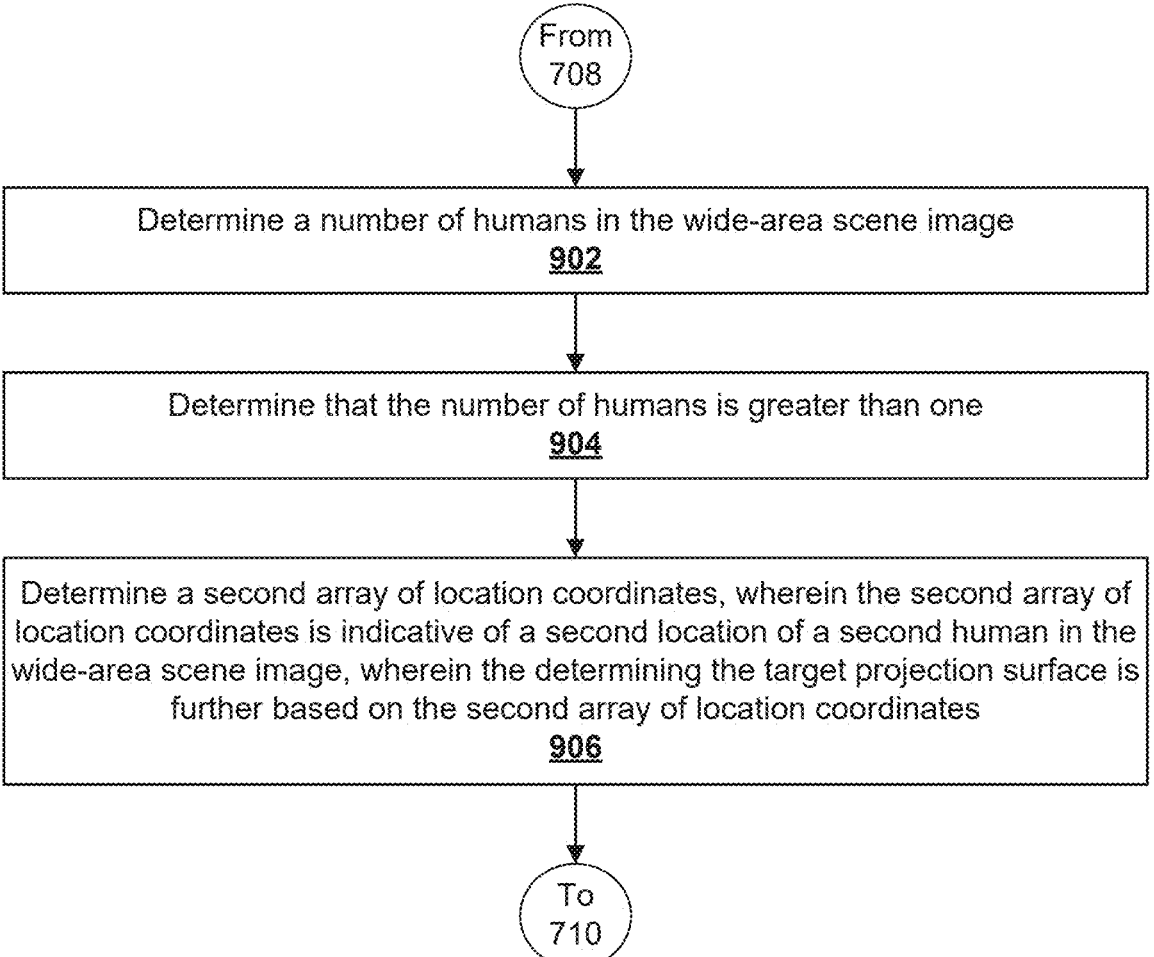
FIG. 9 is a block diagram illustrating an example process for providing steering projection in an instance in which multiple users are present, in accordance with various aspects of the present disclosure.

FIGS. 7-9 are block diagrams illustrating example computer-implemented methods for steering projection based on computer vision determination of body position, gaze, and pointing gestures, in accordance with various aspects of the present disclosure. Example flowcharts are illustrated that contain example operations implemented by various examples described herein. The operations illustrated in FIGS. 7-8 may, for example, be performed by a system embodied by an apparatus 200, which is shown and described in connection with FIG. 2. To perform the operations described below, the apparatus 200 may utilize one or more of processor 202, memory 204, communications hardware 206, steerable projector 208, context camera 210, and/or any combination thereof. It will be understood that user interaction with the apparatus 200 may occur directly via communications hardware 206, or may instead be facilitated by a separate user device, and which may have similar or equivalent physical componentry facilitating such user interaction.

Turning first to FIG. 7, as shown by operation 702, the apparatus 200 includes means, such as processor 202, memory 204, communications hardware 206, context camera 210, or the like, for identifying a set of candidate projection surfaces. In various examples, the set of candidate projection surfaces may be captured originally using context camera 210, and the set of candidate projection surfaces may be identified using processor 202 and cached or stored in memory 204 or other storage for later retrieval. In various examples, the set of candidate projection surfaces may be received via communications hardware 206, for example, if the processing of image data to determine the set of candidate projection surfaces is performed remotely, using a cloud server or the like.

Regardless of how the set of projection surfaces is created and/or captured, the processor 202 may identify the set of candidate projection surfaces including data about each projection surface such as its location, facing angle, color, shape of the surface, and/or the like. The set of projection surfaces may be stored in any data format known in the art, including binary data, plain text, structured plain text, or the like. As described previously, positional data for the candidate projection surfaces may be stored in any of various coordinate systems, including coordinates of the image provided by context camera 210 or coordinates of the physical space (e.g., eliminating any distortions caused by the wide-angle lens of the context camera 210).

In various examples, ephemeral conditions may activate or deactivate certain projection surfaces, and the processor 202 may exclude deactivated projection surfaces. For example, a wall in a living room may receive direct sunlight at certain periods of the day, and the processor 202 may automatically deactivate a projection surface on the brightly lit wall due to poor visibility at the appropriate times of day.

As shown by operation 704, the apparatus 200 includes means, such as processor 202, communications hardware 206, context camera 210, or the like, for receiving a voice or other command to begin projection. As described previously, users may issue voice commands such as "project over here," "follow me," "follow my gaze," or the like to indicate the start of projection and the desired mode for selecting a projection surface. However, in some other examples, projection may be initiated in response to other inputs besides voice commands. For example, a user may use a companion application for the projector device that is executed by a mobile device to initiate and/or discontinue projection. In still other examples, a remote control device that communicates with the projector device using radio frequency signals, IR control signals, etc., may be used. Moreover, the desired mode of operation may be inferred or otherwise defined in the absence of a corresponding verbal command (e.g., a default mode of operation may be defined in the absence of an explicit mode selection, or a mode of operation may be inferred by user gestures occurring during delivery of instructions).

In various examples, the context camera 210 may capture an image of the room, and processor 202 may use an object detection and/or pose detection model to identify if a human is in the room while the voice or other command is received, ensuring projection does not unintentionally start when the user is present in a nearby room. In various examples, the check for presence of a human in the room using context camera 210 and processor 202 may be overridden by certain voice commands and/or other control inputs. For example a command "show the weather in the living room," may start projection regardless of whether a human is detected in the room.

In various examples, the human detected by context camera 210 may be further identified as a particular user using further object detection or identification models. For example, a user may say "show my calendar over here" and the correct calendar information may be retrieved based on an identification result using the context camera 210 and processor 202. In various examples, voice identification from a microphone of the communications hardware 206 may be used in conjunction with or in place of visual identification of a user, for example, if the user is partially obscured, occluded, or the ability to visually identify the user is impaired.

In various examples, the processor 202 may require additional information beyond the voice command to determine an image to project. The processor 202 may direct the communications hardware 206 to speak a clarifying question to iterate with the user (e.g., "which episode did you want me to project?") and/or the steerable projector 208 may project the clarifying question in text on the target projection surface (or any other candidate projection surface). The clarifying question may, additionally or alternatively, use speakers of the communications hardware 206 and the steerable projector 208 in conjunction for certain clarifying questions. For example, if a user's pointing gesture is determined to be ambiguous, the question "did you mean surface A or surface B?" may be spoken, while two surfaces may be identified as A and B using the steerable projector 208.

As shown by operation 706, the apparatus 200 includes means, such as processor 202, context camera 210, or the like, for capturing a wide-area scene image (or a scene image), wherein the scene image may have a top-down perspective. In various examples, the apparatus 200 may be positioned on the ceiling of a room so the context camera 210 may capture an overhead image. As discussed previously, the context camera 210 may include a wide-angle or fisheye lens for capturing a hemispherical wide-area scene image that includes the context of the entire room.

The processor 202 may direct the context camera 210 to capture the room image upon receiving the voice command to begin projection. The context camera 210 may further process the scene image using onboard processing, for example, by formatting, scaling, compressing, or otherwise transforming the raw image data, or the processor 202 may perform various transformations of the raw image data as provided directly by the context camera 210.

In various examples, the context camera 210 may capture a still image, or the context camera 210 may capture a series of images or short video. In examples in which the context camera 210 captures multiple image frames, the images may be filtered by the processor 202 using pre-filtering to identify high-quality images that are likely to yield high-probability detection and identification of poses.

In various examples, multiple image frames may also be captured to detect motion. For example, two images showing a human in two different positions consistent with the direction the human is facing in the images may be interpreted as motion using subsequent post processing by the processor 202. The detection of motion using multiple scene images may be utilized in later operations, for example, to predict a future location of a human and identify a projection surface near the user's future position. Although various examples described herein may refer to a single scene image, it will be understood that the procedures described in connection with FIGS. 7-9 may be repeated iteratively for a series of image frames taken as part of a short video or time lapse.

As shown by operation 708, the apparatus 200 includes means, such as processor 202, memory 204, communications hardware 206, or the like, for determining a first array of location coordinates. The first array of location coordinates may be indicative of a first location of a first human in the scene image. The first array of location coordinates may be further indicative of a pointing direction of the first human in the scene image. The processor 202 may use an object detection or identification model and/or a pose detection model as described previously to generate the first array of location coordinates. The pose detection or other model may receive the wide-angle image as input. In various examples, the processor 202 may perform additional steps to clean, format, or otherwise prepare the wide-angle image to be provided as input to the pose detection or other model for determining the first array of location coordinates.

The object detection or identification model and/or pose detection model may be any of the types of models described previously, such as a CNN-based model, transformer, ML model, or rules-based model. In various examples, where an ML or AI model is used to identify the first location of the first human and/or pose or gaze information of the first human, the model may be trained using similar images to those captured by the context camera 210 (e.g., overhead, using a wide-angle lens, etc.). For example, the pose detection or other model may be trained using data collected by cameras similar to the context camera 210 (e.g., having the same lens), installed in similar positions (e.g., on the ceiling of a room), and labeled using actual position and pose information of human subjects in the room. The breadth of training data using similar properties such as camera angle and lens type may allow the pose detection or other model to identify human subject positions and poses in a wide variety of rooms and settings.

The output from the object detection or identification model and/or pose detection model may be provided as a set of coordinates (e.g., an array of location coordinates) in any data format known in the art. The set of coordinates may represent various skeletal landmark points (e.g., corresponding to body parts such as shoulders and hips). For example, the model may provide four coordinates that constitute a bounding box where a detected human subject is determined to be located with a certain degree of confidence. The bounding box may thus cover a region in the scene image occupied by the first human. The model may further provide a measure of the degree of confidence, such as a probability or confidence score, associated with the bounding box. In various examples, an object identification model may further provide an identification of the detected object in the bounding box (typically "human" in examples disclosed herein, although further identification may be provided such as a user identification or the like, if the user has previously registered an identity for authentication purposes, for example). In some implementations, the bounding box may cover an entirety of its detected object (e.g., the first human), while in others the bounding box cover less than all of the detected object but more than a predefined proportion of the detected object (e.g. approximately all, or more than 90%, or the like).

In various examples, the pose detection or other model may be stored as instructions using memory 204 or other storage and executed by processor 202. In other examples, the pose detection or other model may be executed using a remote device such as a cloud server, in which case the communications hardware may transmit and receive input and output to and from the model.

Turning now to FIG. 8, example operations are shown for providing steering projection based on a gaze and/or hand gesture determination. As shown by operation 802, the apparatus 200 includes means, such as processor 202, memory 204, or the like, for determining, using the pose detection model, a gaze direction. The first array of location coordinates may further identify the gaze direction. For example, the first array of location coordinates may include four coordinates to define the bounding box, as described previously, and may further include two coordinates defining a gaze vector. Additionally or alternatively, the first array of location coordinates may include a position and angle to define the gaze. In some examples, only an angle may be provided to determine the gaze vector using the position defined by the bounding box combined with the angle. Regardless of the format in which the gaze direction is defined by the array of location coordinates, the gaze direction may be effective to represent the orientation of the human subject's field of view in the image based on a determined pose of the human, such as shoulder, head, and/or eye positions.

As shown by operation 804, the apparatus 200 includes means, such as processor 202, memory 204, or the like, for determining, using the pose detection model, a hand or bodily gesture direction. The first array of location coordinates may further identify the bodily gesture or hand gesture direction. For example, the first array of location coordinates may include four coordinates to define the bounding box, as described previously, and may further include two coordinates defining a gesture vector. Additionally or alternatively, the first array of location coordinates may include a position and angle to define the gesture. In some examples, only an angle may be provided to determine the gesture vector using the position defined by the bounding box combined with the angle. Regardless of the format in which the gesture direction is defined by the array of location coordinates, the gesture direction may be effective to represent the inferred focal direction of a human subject in the image based on a determined pose of the human, such as shoulder, elbow, and/or hand positions.

In various examples, the first array of location coordinates provided by the pose detection model may be a set of coordinates (e.g., landmark points) that correspond to various body parts of a human subject (e.g., shoulders, hips, ankles, etc.). The processor 202 may execute instructions to format the landmark points from the pose detection model and determine points of derived data, such as angles, vectors, or other points indicative of gestures performed by a human subject.

Although various examples are described herein regarding a simple pointing hand gesture, additional gestures may be included in various examples. For example, foot gestures may be incorporated (e.g., for improved accessibility for certain users) using the same pose detection model configured to identify a gesture vector based on foot, knee, and/or hip locations.

Additional gestures may rely on multiple frames of image data with subsequent post-processing to implement. For example, a "waving" or "sweeping" gesture may indicate a wide area as a user sweeps their hand across an angle. Gesture vectors from multiple frames (as described previously in connection with operation 706) may be determined using the pose detection model and subsequently processed to determine, for example, the angle of a sweeping or waving gesture. Likewise, multiple-image gestures may be derived from determinations of gaze, such as determination of a user sweeping their gaze across an area of the room.

Turning now to FIG. 9, example operations are shown for providing steering projection in an instance in which multiple users are present. As shown by operation 902, the apparatus 200 includes means, such as processor 202, memory 204, or the like, for determining, using the pose detection model, a number of humans in the scene image. The object detection and/or object identification model may determine not only the position of a single human subject, but may further identify additional humans in the scene image. As described above for the first human, a second (or third, etc.) human in the scene image may also be associated with a bounding box. The second human in the scene image may also be associated with an identification (e.g., typically "human") and a probability or confidence score.

As shown by operation 904, the apparatus 200 includes means, such as processor 202, memory 204, or the like, for determining that the number of humans is greater than one. As described previously in connection with operation 902, the object detection and/or object identification model may determine not only the position of a single human subject, but may further identify the positions of any additional humans in the scene image. In an instance in which additional humans are detected and/or identified in the same image, and the confidence level of the detected and/or identified humans is above a certain threshold (which may be predefined), the processor 202 may determine that the number of humans found in the area of the scene image is greater than one. The object detection and/or object identification model may produce a bounding box and/or an indication of the spatial location of each of the detected and/or identified human subjects in the scene image.

As shown by operation 906, the apparatus 200 includes means, such as processor 202, memory 204, or the like, for determining, using the pose detection model in response to the number of humans being greater than one, a second array of location coordinates, wherein the second array of location coordinates is indicative of a second location of a second human in the scene image, wherein the determining the target projection surface is further based on the second array of location coordinates. The pose detection model may produce the second array of location coordinates, for example, as a second bounding box (e.g., comprising four coordinates). The second bounding box may enclose an area of the wide are image determined to be likely to contain a second human subject.

In various examples, determining the target projection surface may be based on a target score. This target score may be computed using just the first array of location coordinates (e.g., the first bounding box representative of the first human), or it may comprise a multi-user target score computed based on the first array of location coordinates and further based on the second array of location coordinates (e.g., the second bounding box representing the second human). For example, candidate projection surfaces may receive a multi-user target score computed using the distance to both the first bounding box and the second bounding box. For example, a simple score may be computed by summing the distances to each bounding box detected in the scene image. Other functional forms may be used to determine the target projection surface, for example, that assign a higher weight to candidate projection surfaces that are close to a bounding box, and have a slowly descending target score for longer distances. It will be understood that any of the various possible functional forms may be selected for choosing the target projection surface from the set of candidate projection surfaces, and that any number of bounding boxes may be detected in the scene image and used as inputs to determine the target projection surface.

In various examples, gaze and/or gesture vectors associated with a second human and/or additional human subjects in the wide area image may be further used to determine the target projection surface.

Returning now to FIG. 7, as shown by operation 710, the apparatus 200 includes means, such as processor 202, memory 204, or the like, for determining a target projection surface from the set of candidate projection surfaces based on a proximity to the first location of the first human and the pointing direction of the first human. As described previously in connection with FIGS. 8-9, the determination of the target projection surface may be based on proximity to the first location of the first human, a pointing direction of the first human, and may be further based on additional locations of additional human subjects detected in the scene image and/or gaze, gesture, or other pointing vectors associated with any of the additional human subjects detected in the scene image.

For example, the processor 202 may compute the distance for each candidate projection surface to the first location associated with the first human. The processor 202 may simply choose the projection surface nearest to, or having the shortest associated distance from, the first location associated with the first human. In other examples, various other functional forms may be used to determine the target projection surface. More generally, the processor 202 may compute a target score for each candidate projection surface. The target score may be based on the location of the candidate projection surface and any other details known about the candidate projection surface (e.g., facing direction, visual properties, presence or history of obscuring or occluding effects over the surface, etc.) and the array of coordinates associated with the human subject (e.g., bounding box, gaze vector/direction, gesture vector/direction, other pose-related information, identification details, identification confidence score/probability, etc.). In various examples, transient or temporary effects may also be accounted for when determining the projection surface, such as objects causing a temporary visual impairment of the projection surface and/ or obscuring or occluding the projection surface.

The functional form used to determine the target projection surface may depend on the mode of operation. For instance, a voice command may be issued such as "follow my gaze" which may cause the processor 202 to select a projection surface score function that prioritizes projection surfaces close to the gaze vector of the first human subject. In another example, the user may speak a command such as "show the video near us" which may prompt the processor 202 to select a score function that prioritizes finding a projection surface with the shortest distance to the group of human subjects detected in the scene image. For example, the processor 202 may compute a barycenter of the bounding boxes of each human subject found in the scene image and find a projection surface that minimizes the distance to the barycenter. In another example, the processor 202 may use other functions that depend on the coordinates of each of the bounding boxes of the human subjects detected in the room, and aims to find a projection surface nearest to each of the humans.

More generally, it will be understood that the apparatus 200 may determine the target projection surface based on any combination of the context factors mentioned above. To this end, the target projection surface may be determined based only on proximity of a first human to the various candidate projection surfaces. Alternatively, the target projection surface may be determined based only on the pointing direction of the first human, or only on the gaze direction of the first human, or only on the hand direction of the first human. Still further, the target projection surface may be determined based on any combination of these (or other) context factors available to the apparatus 200.

As shown by operation 712, the apparatus 200 includes means, such as processor 202, memory 204, steerable projector 208, or the like, for orienting a projection lens toward the target projection surface. The steerable projector 208 may use motors or other machinery to orient the projection lens toward the target projection surface. The processor 202 may retrieve the coordinates of the target projection surface from memory 204 or other storage, and/or the processor 202 may convert stored coordinates of the target projection surface into coordinates usable by the steerable projector to cause the device to orient toward the target projection surface. The coordinates of the target projection surface may be stored, for example, as a dictionary or lookup table in memory 204, and the coordinates of the target projection surface may be retrieved from among a data structure including coordinates of each candidate projection surface.

As shown by operation 714, the apparatus 200 includes means, such as processor 202, memory 204, communications hardware 206, steerable projector 208, or the like, for projecting a projection image onto the target projection surface. The steerable projector 208 may utilize dToF sensor 506 to apply keystone correction to ensure proper display of the projection image. The steerable projector 208 may project the projection image onto the target projection surface in response to feedback indicating that the projection lens is properly oriented to project onto the target projection surface. The projection image may be selected and determined by the processor 202 and provided to the steerable projector 208. The projection image may be based at least in part, for example, on the voice command or other commands provided by a user. In various examples, projecting the projection image may be accompanied by sounds or other media provided by the communications hardware 206.

As shown by the arrow from operation 714 to operation 706, the apparatus 200 may repeat operations 706 through 714 in cyclical modes of operation (e.g., "follow me," "follow my gaze," or the like where the target projection surface is intended to change over time based on the movement of individuals within the scene). The procedure may be set into a cyclical operation when the voice command received in operation 704 indicates selection of a cyclical mode of operation. The cyclical procedure may thereafter continue until receipt of a voice command to end projection (which is not explicitly illustrated in FIG. 7 but in some embodiments the receipt of such a command would end the procedure at any operation in the procedure). When operating in a cyclical fashion, the apparatus 200 may, following projection of the projection image in operation 714, repeat operation 706 to receive a new wide-area scene image. Thereafter, in a return to operation 708, the apparatus 200 may update its determination of the first location of the first human (and of any additional humans). In a cyclical mode of operation, the apparatus 200 may at this stage also determine a movement distance between the first location and the updated first location. and may then determine whether the movement distance exceeds a pre-determined threshold and, in response to determining that the movement distance exceeds the pre-determined threshold, may compute an updated target score for each candidate projection surface from the set of candidate projection surfaces. The apparatus 200 may return to operation 710 and determine an updated target projection surface from the set of candidate projection surfaces based on the updated target score for each candidate projection surface. If the updated target projection surface is different from the then-current target projection surface, the apparatus 200 may determine a projection path between the target projection surface and the updated target projection surface, in a return to operation 712. Subsequently, the apparatus 200 may re-orient the projection lens to the newly determined target projection surface and, in a return to operation 714, the steerable projector 208 may project the projection image along newly determined projection path towards the updated target projection surface. In this fashion, the apparatus 200 may enact an indefinite cycle throughout certain operations shown in FIG. 7 when in a cyclical mode of operation, and thereby ensure that the projection image can be displayed on an optimal projection surface over time, which may be dynamically changing over time as individuals move throughout the environment.

In accordance with one or more implementations, an electronic device comprises a plurality of cameras, one or more projectors, one or more microphones (e.g. a microphone array), one or more speakers, and one or more wireless communication components (e.g. one or more wireless transceivers). In accordance with one or more implementations, an electronic device is configured to be mounted to a ceiling and comprises a downward facing 2-pi steradian camera or hemispherical camera.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, the computer-implemented method comprising:

identifying a set of candidate projection surfaces;

receiving a voice command to begin projection;

capturing, using a context camera, a wide-area scene image, wherein the wide-area scene image has a top-down perspective;

determining, using a pose detection model, a first array of location coordinates, wherein the first array of location coordinates is indicative of a first location of a first human in the wide-area scene image, wherein the first array of location coordinates is further indicative of a pointing direction of the first human in the wide-area scene image;

determining the first location of the first human;

determining a target projection surface from the set of candidate projection surfaces based on a proximity to the first location of the first human and the pointing direction of the first human;

determining a second candidate projection surface from the set of candidate projection surfaces based on a proximity to the first location of the first human and the pointing direction of the first human;

determining a first distance from the target projection surface to the first human;

determining a second distance from the second candidate projection surface to the first human;

orienting, by a steerable projector and based on the first distance and the second distance, a projection lens toward the target projection surface; and projecting, by the steerable projector and the projection lens, a projection image onto the target projection surface.

2. The computer-implemented method of claim 1, further comprising:

determining, using the pose detection model, a gaze direction, wherein the first array of location coordinates identifies the gaze direction; and determining, using the pose detection model, a hand gesture direction, wherein the first array of location coordinates identifies the hand gesture direction, wherein determining the target projection surface is further based on the gaze direction and the hand gesture direction.

3. The computer-implemented method of claim 1, further comprising:

determining, using the pose detection model, a number of humans in the wide-area scene image;

determining that the number of humans is greater than one; and determining, using the pose detection model in response to the number of humans being greater than one, a second array of location coordinates, wherein the second array of location coordinates is indicative of a second location of a second human in the wide-area scene image, wherein determining the target projection surface is further based on the second array of location coordinates.

4. An electronic device comprising:

a steerable projector;

a hemispherical camera;

a microphone;

a speaker;

one or more processors; and one or more computer readable media storing processor executable instructions which, when executed using the one or more processors, perform operations comprising:

generating, using the hemispherical camera, first image data representing a scene image;

accessing stored data indicating a set of candidate projection surfaces, the set of candidate projection surfaces including a first candidate projection surface and a second candidate projection surface, and the stored data indicating a first location of the first candidate projection surface and a second location of the second candidate projection surface;

determining, using a machine learning model and the first image data, a first location of a first person, a first distance from the first location of the first person to a second location of the first candidate projection surface, and a second distance from the first location of the first person to a third location of the second candidate projection surface; and based on the first distance and the second distance, projecting an image onto the first candidate projection surface.

5. The electronic device of claim 4, wherein the one or more computer readable media store further processor executable instructions which, when executed using the one or more processors, perform operations comprising:

determining a first array of coordinates indicative of the first location of the first person.

6. The electronic device of claim 4, wherein the one or more computer readable media store further processor executable instructions which, when executed using the one or more processors, perform operations comprising:

determining, using the machine learning model and the first image data, coordinates of a bounding box, wherein the bounding box corresponds to a region in the scene image occupied by the first person; and computing a bounding box target score for each candidate projection surface from the set of candidate projection surfaces, the set of candidate projection surfaces including the first candidate projection surface and the second candidate projection surface, and wherein the bounding box target score of a given candidate projection surface is based in part on a distance between the given candidate projection surface and the bounding box, wherein the projecting of the image onto the first candidate projection surface is based on the bounding box target score for the first candidate projection surface and the bounding box target score for the second candidate projection surface.

7. The electronic device of claim 4, wherein the one or more computer readable media store further processor executable instructions which, when executed using the one or more processors, perform operations comprising:

comparing the first distance to the second distance;

wherein the projecting of the image onto the first candidate projection surface is based on the comparing of the first distance to the second distance.

8. The electronic device of claim 4, wherein the one or more computer readable media store further processor executable instructions which, when executed using the one or more processors, perform operations comprising:

generating, using the hemispherical camera, second image data representing a second scene image;

determining, using the machine learning model and the second image data, a second location of the first person;

determining a third distance from the first location of the first person to the second location of the first person, comparing the third distance to a threshold, based on the comparing of the third distance to the threshold, determining an updated score for each candidate projection surface of a set of candidate projection surfaces, and based on the determining of the updated score for each candidate projection surface of the set of candidate projection surfaces, projecting an image onto the second candidate projection surface.

9. The electronic device of claim 4, wherein the one or more computer readable media store further processor executable instructions which, when executed using the one or more processors, perform operations comprising:

determining a projection path from the first candidate projection surface to the second candidate projection surface; and projecting one or more images along the projection path.

10. An electronic device comprising:

a steerable projector;

a hemispherical camera;

a microphone;

a speaker;

one or more processors; and one or more computer readable media storing processor executable instructions which, when executed using the one or more processors, perform operations comprising:

determining a set of candidate projection surfaces, the set of candidate projection surfaces including a first candidate projection surface and a second candidate projection surface, generating, using the hemispherical camera, first image data representing a scene image;

determining, using a machine learning model and the first image data, gesture data indicating a direction of a gesture of a first person, computing a gesture target score for each candidate projection surface of the set of candidate projection surfaces, wherein the gesture target score of each respective candidate projection surface is based in part on a distance between that respective candidate projection surface and a gesture location determined based on the gesture data, and based on the gesture data and the gesture target score of the first candidate projection surface, projecting an image onto the first candidate projection surface.

11. The electronic device of claim 10, wherein the gesture target score of each respective candidate projection surface is based in part on a respective location associated with that respective candidate projection surface and the gesture location determined based on the gesture data, wherein the projecting of the image onto the first candidate projection surface is based on the gesture target score of the first candidate projection surface.

12. The electronic device of claim 10, wherein the one or more computer readable media store further processor executable instructions which, when executed using the one or more processors, perform operations comprising:

generating, using the microphone, audio data representing an utterance of a user; and determining that the audio data corresponds to a voice command of the user;

wherein the projecting of the image onto the first candidate projection surface is based on the determining that the audio data corresponds to the voice command of the user.

13. The electronic device of claim 12, wherein the one or more computer readable media store further processor executable instructions which, when executed using the one or more processors, perform operations comprising:

sending the audio data to a remote system; and receiving, from the remote system in response to the sending of the audio data, transcription data;

wherein the determining that the audio data corresponds to the voice command of the user is based on the transcription data.

14. The electronic device of claim 12, wherein the determining that the audio data corresponds to the voice command of the user is performed at the electronic device using a second machine learning model.

15. The electronic device of claim 12, wherein the determining that the audio data corresponds to the voice command of the user is performed at the electronic device using a large language model.

16. An electronic device comprising:

a steerable projector;

a hemispherical camera;

a microphone;

a speaker;

one or more processors; and one or more computer readable media storing processor executable instructions which, when executed using the one or more processors, perform operations comprising:

determining a set of candidate projection surfaces, the set of candidate projection surfaces including a first candidate projection surface and a second candidate projection surface, generating, using the hemispherical camera, first image data representing a scene image;

determining, using a machine learning model and the first image data, gaze data indicating a direction of a gaze of a first person, computing a gaze target score for each candidate projection surface of the set of candidate projection surfaces, wherein the gaze target score of each respective candidate projection surface is based in part on a respective location associated with that respective candidate projection surface and a gaze location determined based on the gaze data, and based on the gaze data and the gaze target score of the first candidate projection surface, projecting an image onto the first candidate projection surface.

17. The electronic device of claim 16, wherein the gaze target score of each respective candidate projection surface is based in part on a distance between that respective candidate projection surface and the gaze location determined based on the gaze data, wherein the projecting of the image onto the first candidate projection surface is based on the gaze target score of the first candidate projection surface.

18. The electronic device of claim 16, wherein the one or more computer readable media store further processor executable instructions which, when executed using the one or more processors, perform operations comprising:

generating, using the microphone, audio data representing an utterance of a user; and determining that the audio data corresponds to a voice command of the user;

wherein the projecting of the image onto the first candidate projection surface is based on the determining that the audio data corresponds to the voice command of the user.

19. The electronic device of claim 4, wherein the one or more computer readable media store further processor executable instructions which, when executed using the one or more processors, perform operations comprising:

generating, using the microphone, audio data representing an utterance of a user; and determining that the audio data corresponds to a voice command of the user;

wherein the projecting of the image onto the first candidate projection surface is based on the determining that the audio data corresponds to the voice command of the user.

20. The electronic device of claim 19, wherein the one or more computer readable media store further processor executable instructions which, when executed using the one or more processors, perform operations comprising:

sending the audio data to a remote system; and receiving, from the remote system in response to the sending of the audio data, transcription data;

wherein the determining that the audio data corresponds to the voice command of the user is based on the transcription data.

21. The electronic device of claim 19, wherein the determining that the audio data corresponds to the voice command of the user is performed at the electronic device using a second machine learning model.

* * * * *